A. O. & J. F. RUTZ.
BORING MACHINE.
APPLICATION FILED MAR. 12, 1914.

1,114,531.

Patented Oct. 20, 1914.

Witnesses:
Casonodo Young
May Downey.

Inventors
Arnold O. Rutz
Julius F. Rutz
By Oliphant & Young
Attorneys

UNITED STATES PATENT OFFICE.

ARNOLD O. RUTZ AND JULIUS F. RUTZ, OF MILWAUKEE, WISCONSIN.

BORING-MACHINE.

1,114,531.  Specification of Letters Patent.  Patented Oct. 20, 1914.

Application filed March 12, 1914. Serial No. 824,111.

*To all whom it may concern:*

Be it known that we, ARNOLD O. RUTZ and JULIUS F. RUTZ, both citizens of the United States, and residents of Milwaukee, in the county of Milwaukee and State of Wisconsin, have invented certain new and useful Improvements in Boring-Machines; and we do hereby declare that the following is a full, clear, and exact description thereof.

The primary object of our invention is to provide a simple, economical and effective portable boring and tapping machine capable of being operated in any position, having means for gripping the stock to the material that is worked upon.

Specific objects of the invention are to provide a variable speed gearing between a drive and driven member, which members in this instance comprise a shaft and a tool-holding spindle, the speed gearing being adapted to feed the tool slowly forward in a boring operation and to accelerate the feed of said tool in a thread-cutting operation; to provide means for locking one of the gear members against movement in order to accelerate the speed of the boring and tapping tool when the latter is utilized as a thread-cutter, and to provide means for slidably shifting the driving member of the variable speed gearing to vary the feed of the tool, which shift is accompanied by automatic lock of one of the driven gears.

With the above and other objects in view the invention consists in certain peculiarities of construction and combination of parts as hereinafter set forth with reference to the accompanying drawings and subsequently claimed.

Figure 1:
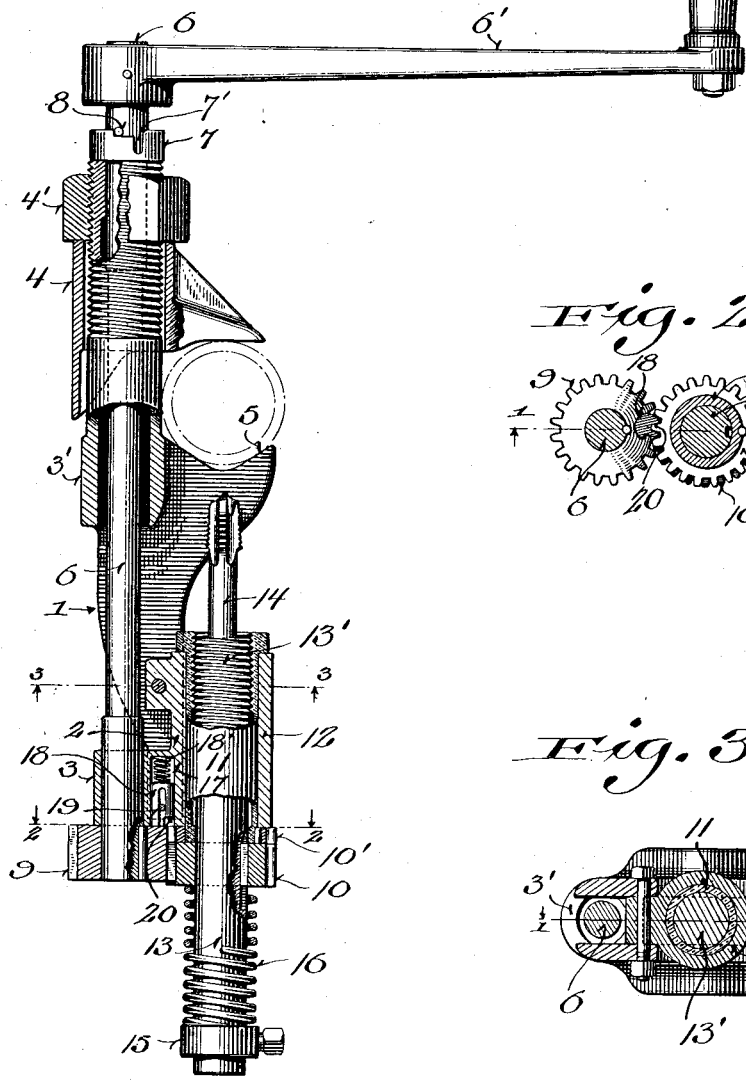
Figure 2:
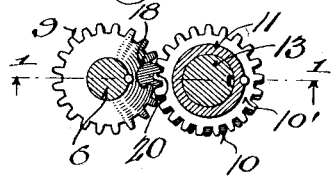
Figure 3:
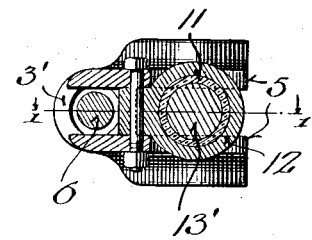

In the drawings Figure 1 represents an elevation partly in section of a machine embodying the features of our invention, the section being indicated by lines 1—1 of Figs. 2 and 3; Fig. 2, a detailed cross-section of the same showing the arrangement of variable speed gearing, the section being indicated by line 2—2 of Fig. 1, and Fig. 3, another cross-section through the machine, the section being indicated by line 3—3 of Fig. 1.

Referring by characters to the drawings, 1 represents a stock provided with a head 2 at one end thereof, which head is formed with a journal-box 3 that is alined with a companion journal-box 3', the same being provided with a projecting end in the form of an exteriorly threaded sleeve. The box 3' has slidably mounted thereon a chucking-block 4, which block is controlled and engaged by a nut 4', whereby the chucking-block is moved backward or forward relative to jaws 5. The jaws and chucking-block are adapted to receive a pipe, as indicated in dotted lines in Fig. 1, or other element to be worked upon. Mounted within the boxes 3 and 3' is a drive-shaft 6 having a crank 6' attached to that end of the shaft which is extended through the exteriorly threaded journal-box 3'. An adjustable collar 7 is mounted upon the drive-shaft between the hub of the crank 6 and the juxtaposed box 3', the said collar being provided with a stepped slot 7' for locking engagement with a pin 8, which pin is carried by the shaft. The opposite end of the shaft has secured thereto a drive gear-wheel 9, which gear-wheel is provided with a wide face and meshes with independently rotative driven toothed gear-wheels 10, 10', that are of the same diameter and in axial alinement, but the gear-wheel 10' has one tooth in excess of its companion gear-wheel 10. The gear-wheel 9 is also equal in diameter to the pair of driven gear-wheels and has the same number of teeth as the gear-wheel 10, but it is apparent that the drive gear-wheel may be of any size, depending upon the speed to be developed in connection with the driven gear-wheels. The driven gear-wheel 10' is fast upon one end of an internally threaded bushing 11, which bushing is journaled in a box 12 that is formed in the head portion 2 of the stop, the said bushing being held against lateral play in one direction by its driving gear-wheel which abuts the end face of the journal-box and in the opposite direction by a collar constituting part of said bushing. The corresponding driven gear-wheel 10 is in spline engagement with a spindle 13, which spindle has a threaded end 13' that extends into and engages the internal threads of the bushing, the said spindle being provided with a combination boring and tapping tool 14 that is seated within its threaded end in any convenient manner.

The outer end of the tool-holding spindle 13 carries a collar 15, between which and the exposed face of the spindle gear-wheel 10 there is interposed a coiled spring 16, the same surrounding said spindle. The head portion 2 of the stop is also provided with a cavity 17 for the reception of a locking plunger 18, between the inner end of which plunger and the bottom of the cavity is fitted a coiled spring 18'. The outer exposed face of the plunger is thus held in engagement with the inner face of the drive gear-wheel 9 and said plunger is also held against twisting by means of a pin 19, which pin is anchored in the head and is fitted into a slot formed in one side of the plunger, whereby longitudinal movement of the latter is permitted within limits. The outer face of the plunger 18 is also formed with a tooth receiving cavity 20 to permit locking engagement of the bushing gear-wheel 10' when said plunger is free to travel outwardly.

From the foregoing description it is apparent that the gear driven bushing constitutes means for feeding the tool longitudinally and the speed in proportion to the number of revolutions of said tool is controlled by locking or releasing the aforesaid bushing. It is also apparent that in either a boring or tapping operation the tool spindle is driven at a uniform speed through its gear connection with the drive-wheel 9.

As an exemplification of our invention the wide faced drive gear-wheel 9 and tool driving gear-wheel 10 each has twenty teeth, while the feed-controlling gear-wheel 10', which is also meshed with the drive-wheel 9 has twenty-one teeth. In a boring or drilling operation the parts are positioned as shown in Fig. 1 of the drawings and hence it is apparent that motion being imparted to the drive-shaft, with each twenty revolutions of the same the tool-holding spindle will make a corresponding number of turns, while the feed bushing will make one less revolution in the same direction, due to the back gear connection of one tooth. This differential speed of the tool-feeding bushing relative to the tool-carried spindle will, through the threaded connection between said parts, cause the spindle to feed the tool forward a distance equal to one turn of the engaged threads, the said spindle, in the meantime, having made twenty revolutions and the slow forward feed will continue until the pipe, as indicated in dotted lines, or other body, is drilled through. When the drilled hole in the metal pipe is completed the spring 16 is only slightly compressed over its normal tension and the tool may be retracted by reversing the motion upon the drive-shaft.

After completing the above operation the position of the shaft collar 7 is shifted to aline the pin 8 with the deep portion of the stepped slot 7', and, by end thrusting the shaft toward the head portion of the stock, the drive gear-wheel 9 will be slidably released from the narrow faced gear-wheel 10' of the feed-bushing and, simultaneously with this movement, the plunger 18 will engage said gear-wheel 10', whereby the latter, together with the bushing, is locked against rotation. The transmission gearing being shifted, the machine is now set for a thread-cutting operation and it should be understood that the shift of gears can be effected either before withdrawal of the tool in a boring operation or after such withdrawal, but the said tool may remain within the bored opening just completed during the shift of gearing. Motion from the drive gear-wheel 9 is now imparted to the spindle gear-wheel 10 only and consequently as said spindle is rotated, it will feed toward the work at a ratio of speed equal to the number of threads per inch of the bushing and threaded end of said spindle, which threads, in practice, are of the same pitch as those of the thread-cutting tool. In this operation, as previously stated, the sleeve is locked against rotation and when the working end of the tool has passed entirely through the bored pipe wall and cut the desired threads, the operation is completed, but, in order to prevent the operator from inadvertently continuing the threading operation and by so doing cause the point of the tool to enter the opposite side of the pipe being worked upon, the forward feed of said tool is limited by total collapse of the coiled spring 16 and hence inadvertent damage to the pipe is avoided by an absolute lock of the feed. The length of feed can be varied by adjusting the collar 15, whereby the scope of the coiled spring 16 is varied. Upon reversal of the drive for retracting the tool it is obvious that the coiled spring 16 will expand to its normal position.

It is obvious from the foregoing description that the boring and drilling machine will operate in any position, and, while we do not wish to restrict the use of said device to specific work, the said machine is particularly designed for drilling and tapping the feed-pipes of gas stoves for attaching pilot-lights of any type. It is also within the scope of our invention to utilize the variable speed gearing for any purpose employing a sleeve and a spindle concentrically mounted therein, the sleeve and spindle carrying gears of equal diameters but varying in the number of teeth and adapted to coöperate with a single driving gear.

We claim:

1. A portable tool comprising a stock having companion journal boxes, one of which is exteriorly threaded, a second journal box spaced from the companion journal-boxes, a shaft mounted in said companion journal-boxes, a spindle mounted in the second journal-box in connection with the shaft, a feed mechanism for the spindle in gear connection with said shaft, a fixed vise-jaw extending from the stock, a slidable chucking-block mounted upon the threaded journal-box opposite the vise-jaw, and an adjustable nut for the chucking-block engageable with the box-threads.

2. A boring machine comprising a stock having a drive-shaft mounted therein, an internally threaded bushing revolubly mounted in the stock, means for selectively locking the bushing against rotation, a tool-holding spindle in threaded engagement with said bushing, a toothed gear-wheel carried by the bushing, and a toothed gear-wheel carried by the spindle, each of said gear-wheels being of equal diameter but having different numbers of teeth therein, a toothed gear-wheel carried by the shaft adapted to engage both the spindle gear-wheel and bushing gear-wheel, and means for releasing the shaft gear-wheel from engagement with one of the first mentioned gear-wheels.

3. A stock having an independent revoluble bushing and spindle in screw-threaded engagement, toothed gear-wheels of the same diameter secured to the bushing and spindle, one of said toothed gear-wheels being provided with a greater number of teeth than its companion gear-wheel, a slidable drive gear-wheel adapted to mesh with one or both of the driven gear-wheels aforesaid, and means for locking that gear-wheel which is freed from engagement with the drive gear-wheel.

4. A boring machine comprising a stock having an independent revoluble bushing and spindle in threaded union with each other, toothed gear-wheels of the same diameter secured to the bushing and spindle, the bushing gear-wheel having one tooth in excess of the spindle gear-wheel, a toothed driving-wheel adapted to mesh simultaneously with each of the aforesaid gear-wheels, means for slidably releasing the drive gear-wheel from its meshed engagement with the bushing gear-wheel, and means for automatically locking the bushing against rotation following a release of its meshed engagement with the drive-wheel.

5. A boring machine comprising a stock having a longitudinally shiftable drive-shaft mounted therein, a revoluble bushing mounted in the stock having an internal thread, a tool-carrying spindle revolubly mounted within the bushing and in threaded engagement therewith, a toothed gear-wheel secured to one end of the bushing, a toothed gear-wheel corresponding in diameter to the bushing gear-wheel in spline engagement with the spindle, a spring-controlled locking plunger for engagement with the bushing gear-wheel, and a drive gear-wheel secured to the shaft in mesh with the bushing and spindle gear-wheels, one face of the drive-wheel being adapted to control movement of the locking plunger.

6. A boring machine comprising a stock, a shaft revolubly mounted therein, work-clamping means carried by the stock, a bushing revolubly mounted in the stock having an internal thread, a spindle fitted within the bushing and in threaded engagement therewith, a gear-wheel secured to the bushing, a gear-wheel in spline engagement with the spindle, a gear carried by the shaft for imparting motion at different speeds to the spindle and bushing gear-wheels, means for disengaging the bushing gear-wheel from the driving gear carried by the shaft, and means for locking the said bushing gear-wheel after such disengagement.

In testimony that we claim the foregoing we have hereunto set our hands at Milwaukee in the county of Milwaukee and State of Wisconsin in the presence of two witnesses.

ARNOLD O. RUTZ.
JULIUS F. RUTZ.

Witnesses:
N. E. OLIPHANT,
M. E. DOWNEY.